United States Patent
Engrand et al.

(10) Patent No.: US 12,297,818 B2
(45) Date of Patent: May 13, 2025

(54) SEALING DEVICE FOR A HYDRAULIC MACHINE

(71) Applicant: Poclain Hydraulics Industrie, Verberie (FR)

(72) Inventors: Julien Engrand, Verberie (FR); Gilles Grillon, Verberie (FR); Stéphane Quertelet, Verberie (FR)

(73) Assignee: Poclain Hydraulics Industrie (FR)

( * ) Notice: Subject to any disclaimer, the term of this patent is extended or adjusted under 35 U.S.C. 154(b) by 36 days.

(21) Appl. No.: 17/926,942

(22) PCT Filed: May 10, 2021

(86) PCT No.: PCT/FR2021/050793
§ 371 (c)(1),
(2) Date: Nov. 21, 2022

(87) PCT Pub. No.: WO2021/240090
PCT Pub. Date: Dec. 2, 2021

(65) Prior Publication Data
US 2023/0193885 A1 Jun. 22, 2023

(30) Foreign Application Priority Data

May 25, 2020 (FR) ...................................... 2005492

(51) Int. Cl.
*F16J 15/34* (2006.01)
*F04B 1/0448* (2020.01)
*F16J 15/00* (2006.01)

(52) U.S. Cl.
CPC ........... *F04B 1/0448* (2013.01); *F16J 15/006* (2013.01); *F16J 15/344* (2013.01)

(58) Field of Classification Search
CPC .......... F16J 15/06; F16J 15/006; F16J 15/164; F04B 1/0448; F04B 1/122
See application file for complete search history.

(56) References Cited

U.S. PATENT DOCUMENTS

| | | | | |
|---|---|---|---|---|
| 3,073,657 A | * | 1/1963 | Oxford | ................... F16J 15/344 |
| | | | | 384/489 |
| 3,201,135 A | * | 8/1965 | Hayatian | ................ B62D 55/15 |
| | | | | 277/367 |

(Continued)

FOREIGN PATENT DOCUMENTS

| | | | |
|---|---|---|---|
| DE | 3141512 A1 | * 5/1983 | ............. F16J 15/344 |
| EP | 1 679 458 A1 | 12/2006 | |

(Continued)

OTHER PUBLICATIONS

International Search Report of International Application Serial No. PCT/FR2021/050793 dated Sep. 10, 2021, (w/English Translation) 4 pages.

*Primary Examiner* — Eugene G Byrd
*Assistant Examiner* — L. Susmitha Koneru
(74) *Attorney, Agent, or Firm* — Lippes Mathias LLP

(57) ABSTRACT

A hydraulic machine has a first assembly and a second assembly movable in rotation relative to each other along an axis of rotation. The hydraulic machine has a crankcase defining an internal volume, in which an interface between the fixed assembly and the movable assembly has a housing provided with a first sealing element ensuring the sealing of the internal volume relative to the external environment. A second sealing element is positioned between the internal volume and the housing. The second sealing element is adapted to allow a passage of fluid from the internal volume to the housing when the pressure deviation between the internal volume and the housing is less than or equal to a threshold value, and to isolate the housing from the internal volume when the pressure deviation is greater than the threshold value.

13 Claims, 4 Drawing Sheets

(56) References Cited

U.S. PATENT DOCUMENTS

| | | | | |
|---|---|---|---|---|
| 3,291,494 | A | * | 12/1966 | Hatch ................ F16J 15/36 |
| | | | | 277/917 |
| 4,284,280 | A | | 8/1981 | Bertram et al. |
| 4,723,782 | A | * | 2/1988 | Muller ............... F16J 15/164 |
| | | | | 277/589 |
| 5,172,727 | A | * | 12/1992 | Stoll ................ F16J 15/3252 |
| | | | | 137/625.68 |
| 6,092,809 | A | * | 7/2000 | Keifer ............. F16J 15/3456 |
| | | | | 277/390 |
| 8,033,210 | B2 | * | 10/2011 | Lemaire ............. F03C 1/045 |
| | | | | 91/519 |
| 8,413,994 | B2 | * | 4/2013 | Jordan ............... F16J 15/164 |
| | | | | 277/552 |
| 2004/0256808 | A1 | * | 12/2004 | Tsuboi ................ F16J 15/36 |
| | | | | 277/377 |
| 2005/0110219 | A1 | * | 5/2005 | Tsuboi .............. F16J 15/344 |
| | | | | 277/358 |
| 2009/0066034 | A1 | * | 3/2009 | Jordan ............... F16J 15/164 |
| | | | | 277/518 |
| 2009/0108542 | A1 | * | 4/2009 | Jordan ............... F16J 15/164 |
| | | | | 277/589 |
| 2011/0012312 | A1 | * | 1/2011 | Zitting .............. F16J 15/164 |
| | | | | 277/500 |

FOREIGN PATENT DOCUMENTS

| | | |
|---|---|---|
| EP | 3 480 458 A1 | 5/2019 |
| WO | WO 2019/043002 A1 | 3/2019 |

* cited by examiner

SEALING DEVICE FOR A HYDRAULIC MACHINE

BACKGROUND OF THE DISCLOSURE

The present disclosure relates to an improved sealing device for a hydraulic machine, and more specifically to a sealing protection device against peak pressures.

STATE OF THE ART

The use of rotating machines in different environments raises issues in terms of sealing. Indeed, a recurring issue is to prevent the intake of impurities into an internal volume of the crankcase of the rotating machine.

Different sealing structures have been proposed in order to ensure good sealing between the internal volume of the rotating machine and the external environment. However, the known solutions remain problematic in terms of reliability, in particular over time.

A first mounting consists in placing a single sealing element ensuring isolation between the surrounding environment and the internal volume of the crankcase. However, in the event of a pressure rise in the crankcase, the sealing element may be expelled from its housing, or destroyed, for example by tearing or by seizing of the surfaces in sliding contact in the case of metal sealing because the bearing force between two sliding portions increases. This results in high friction and loss of efficiency in the case of metal seals. Such pressure rises in the crankcase are due, for example, to the start-up of a cold hydraulic machine. Pressurized oil reaches the crankcase of the machine, through the usual internal leakages in these machines, while the crankcase oil cannot easily escape through the crankcase drain pipe which is still full of oil cold and therefore generating very high pressure drops due to the high viscosity of the cold oil. Such operations quickly destroy the sealing element. Particularly, if the pressure rises in the crankcase of the machine, the bearing force between sliding portions of the sealing element increases, and seizing or extrusion may follow in the event of flexible sealing element, which destroys the sealing element. The components of the sealing element can also be destroyed by the pressure.

Alternatively, the anti-pollution sealing elements ensuring the isolation between the surrounding environment and the internal volume of the crankcase can be disposed in dedicated housings, these housings being themselves isolated from the internal volume of the crankcase comprising the rotating machine, for example a hydraulic machine, by a crankcase sealing commonly qualified as absolute sealing, associating a dynamic sealing element such as a lip ring with a dynamic sealing element resistant to possible peak pressures, for example an O-ring coupled to an annular element. However, such a mounting thus defines a closed chamber between the axial sealing elements and the crankcase sealing elements. However, such a closed chamber raises an issue in terms of lubrication. Indeed, the housing comprising the axial sealing elements being totally isolated from the internal volume of the crankcase by the crankcase sealing, this housing is not continuously lubricated, in particular in the event of loss of lubricant over time, or degradation of its characteristics. However, a lack of lubrication can lead to rapid destruction of the sealing elements, in particular under the effect of seizing or extrusion due to a lack of oil. The solutions commonly proposed consist of inserting a predetermined oil volume into this housing, this oil volume necessarily having to be replaced at regular intervals. The housing must also have a sufficient volume which makes the hydraulic machine less compact. It is however understood that such solutions are highly restrictive and require dedicated maintenance operations.

The present disclosure thus aims to at least partially address these issues.

SUMMARY OF THE DISCLOSURE

To this end, the present disclosure relates to a hydraulic machine comprising a first assembly and a second assembly movable in rotation relative to each other along an axis of rotation, said hydraulic machine comprising a crankcase defining an internal volume, in which an interface between the fixed assembly and the movable assembly comprises a housing provided with a first sealing element ensuring the sealing of the internal volume vis-à-vis the external environment, characterized in that a second sealing element is positioned between the internal volume and the housing, said second sealing element being adapted to allow a passage of fluid from the internal volume to the housing when the pressure deviation between the internal volume and the housing is less than or equal to a pressure threshold value, and to prohibit a passage of fluid from the internal volume to the housing when the pressure deviation between the internal volume and the housing exceeds the threshold value is greater than said pressure threshold value.

According to one example, the second sealing element comprises a passage adapted to be closed when the pressure in the internal volume or in the housing exceeds a threshold value, or for example when the pressure difference between the internal volume and the housing exceeds a threshold value, typically 0.1, 0.2 or 0.5 bar.

According to one example, the first sealing element is an axial seal comprising a first metal annulus, a second metal annulus, a first elastomeric annulus and a second elastomeric annulus, the first metal annulus and the second metal annulus being mounted bearing against each other along an axial direction defined by the axis of rotation, the first elastomeric annulus being interposed between the first metal annulus and a wall of the first assembly, and the second elastomeric annulus being interposed between the second metal annulus and a wall of the second assembly.

According to one example, the second sealing element comprises an O-ring.

The second sealing element then typically comprises a ring on which the O-ring is mounted.

The ring then typically comprises a bore, adapted to allow a passage of fluid when the pressure deviation between the internal volume and the housing is less than or equal to said pressure threshold value, and not to allow a passage of fluid when the pressure deviation between the internal volume and the housing is greater than said pressure threshold value.

According to one example, the second sealing element is positioned between two rolling elements ensuring the relative rotational movement between the first assembly and the second assembly.

According to one example, the second sealing element is made in one piece.

According to one example, the second sealing element is adapted, when the pressure deviation between the internal volume and the housing is less than or equal to the pressure threshold value, to allow a passage of fluid from the housing to the internal volume, and when the pressure deviation between the internal volume and the housing is greater than the pressure threshold value, to isolate the housing from the internal volume.

According to one example, the second sealing element is interposed between two surfaces facing each other along the axial direction defined by the axis of rotation.

According to one example, the second sealing element is interposed between two surfaces facing each other along the radial direction relative to the axis of rotation.

According to one example, the pressure threshold value is equal to 0.5 bar, or 0.2 bar, or even 0.1 bar.

The hydraulic machine is for example a machine comprising a cylinder block provided with a plurality of housings extending radially relative to the axis of rotation in which cylinders are disposed, and a multi-lobe cam surrounding the cylinder block.

BRIEF DESCRIPTION OF THE DRAWINGS

The invention and its advantages will be better understood upon reading the detailed description given below of different embodiments of the invention given by way of non-limiting examples.

In all the figures, the elements in common are identified by identical numerical references.

DETAILED DESCRIPTION OF THE PREFERRED EMBODIMENTS

One exemplary embodiment of the invention is described below with reference to FIGS. 1 to 5.

Figure 1:
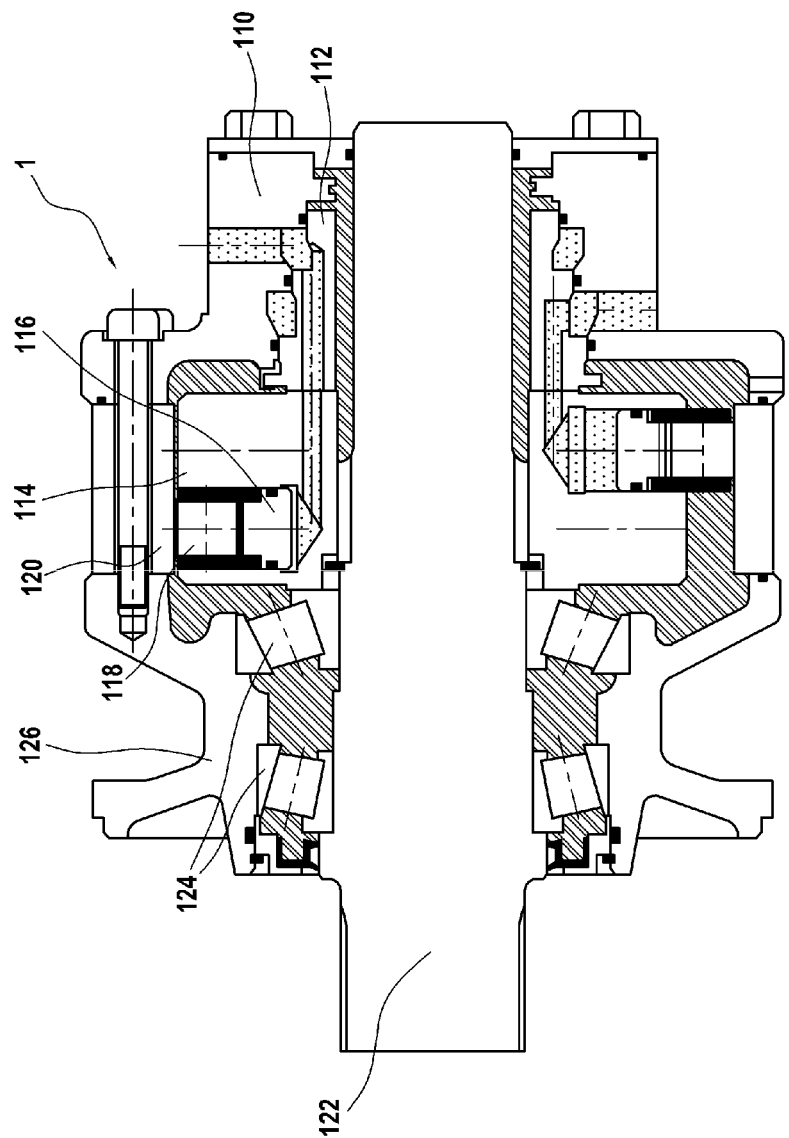
FIG. 1 shows a cross-sectional elevational view of an example of a hydraulic machine according to one aspect of the disclosure.

FIG. 1 represents a sectional view of a hydraulic machine 1, typically a radial-piston and multilobe-cam hydraulic machine. By hydraulic machine is typically meant a hydraulic motor or a hydraulic pump, these apparatuses typically having a reversible operation. The hydraulic machine 1 comprises a distributor cover 110, a supply distributor 112, an assembly which is commonly referred to as hydro-torque including a cylinder block 114 and pistons 116 equipped with a bearing roller 118, and a multilobe cam 120, a shaft 122 and a bearing 124 consisting of a bearing assembly, and a bearing cover 126. The shaft 122 is mechanically connected to the cylinder block 114 to transmit a rotational movement resulting from a torque applied to the shaft 122 or from a sliding of the pistons 116 in contact with the multilobe cam 120. The distributor cover 110 includes supply ducts for the suction and the delivery of the hydraulic machine 1. The suction and delivery ducts, the ducts of the distributor and the piston chambers of the cylinder block are connected to a hydraulic power circuit, which transmits the hydraulic motive power. For example, they are connected to the feed and return branches, or high-pressure HP and low-pressure LP branch of a closed-loop hydraulic circuit, or to the supply line by a power pump and to the return line towards a tank for an open-loop hydraulic circuit. In the example illustrated, the distributor cover 110, the cam 120 and the bearing cover 126 define a crankcase of the hydraulic machine 1.

The volume contained in the crankcase around the different aforementioned elements represents the internal volume of the hydraulic machine 1. It is represented by hatching in FIG. 1. It is isolated from the hydraulic power circuit (represented by dotted lines) by the sealing of the pistons 116 and of the distributor 112 in a manner known to those skilled in the art. The internal volume of the hydraulic machine 1 receives an oil flow rate coming from the internal leakages of the hydraulic machine 1 coming from the power circuit, and it is typically connected by a drain to a tank to discharge this oil flow rate, such that the pressure in the internal volume of the hydraulic machine 1 remains substantially equal to the pressure of said tank, which is typically equal to or close to atmospheric pressure.

Figure 2:
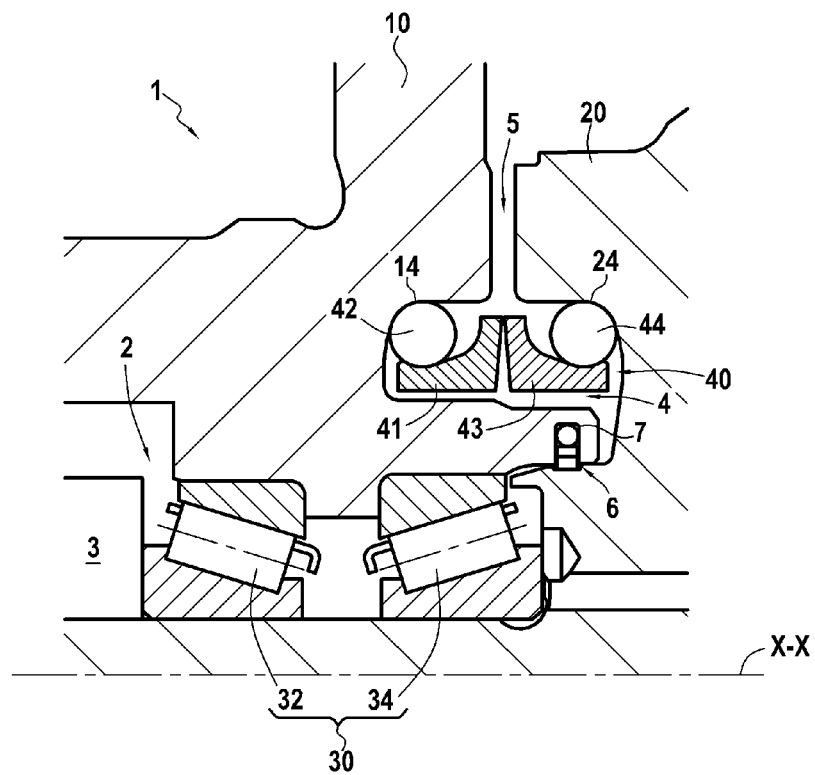
FIG. 2 shows a cross-sectional elevational view of an example of a hydraulic machine according to one aspect of the disclosure.

FIG. 2 represents a partial sectional view of a hydraulic machine 1. The hydraulic machine 1 comprises a first assembly 10 and a second assembly 20 movable in rotation relative to each other along an axis of rotation X-X. In the following description, the designations "radial" and "axial" are defined relative to the axis of rotation X-X unless otherwise stated.

In the example illustrated, the rotational movement is ensured by rolling elements, here tapered bearings 32 and 34 forming a bearing 30. The hydraulic machine 1 comprises an internal volume 2 in which different components 3 of the hydraulic machine depending on its nature are disposed, for example a radial-piston or axial-piston hydraulic motor, a radial-piston or axial-piston hydraulic pump, a braking system, or any other apparatus.

The first assembly 10 and the second assembly 20 designate the different components of the hydraulic machine. By way of example, one of these assemblies can comprise a shaft, a cylinder block and a distributor of a hydraulic machine, while the other of these assemblies can comprise a multi-lobe cam. The first assembly 10 and the second assembly 20 can comprise braking means, for example disks adapted to prevent the relative rotational movement of the first assembly 10 relative to the second assembly 20 under the effect of friction between said disks.

The internal volume 2 of the hydraulic machine is isolated from the external environment via a first sealing element 40 disposed in a housing 4. The housing 4 is connected to the external environment via a duct 5, formed by a gap between the first assembly 10 and the second assembly 20. In the example illustrated, the first sealing element 40 is an axial seal, or floating seal, commonly referred to as a duo-cone seal.

The first sealing element 40 here comprises a first metal annulus 41 and a second metal annulus 43, made of metal material, and which are typically symmetrical relative to a plane extending radially relative to the axis of rotation X-X. The first sealing element 40 also comprises a first elastomeric annulus 42 and a second elastomeric annulus 44, made of elastomeric material.

The first metal annulus 41 and the second metal annulus 43 bear against each other along the axial direction defined by the axis of rotation X-X.

The first elastomeric annulus 42 is mounted bearing against the first metal annulus 41 on the one hand, and against a partition 14 of the first assembly 10 on the other hand.

The second elastomeric annulus 44 is mounted bearing against the second metal annulus 43 on the one hand, and against a partition 24 of the second assembly 20.

The first elastomeric annulus 42 and the second elastomeric annulus 44 are typically positioned radially on the outside relative to the first metal annulus 41 and to the second metal annulus 43. The first metal annulus 41 and the second metal annulus 43 compress the first elastomeric annulus 42 and the second elastomeric annulus 44 against the partitions 14 and 24 respectively of the first assembly 10 and of the second assembly 20, and thus ensure a sealed connection.

The first metal annulus 41, the second metal annulus 43 as well as the partitions 14 and 24 respectively of the first assembly 10 and of the second assembly 20 are typically formed such that the first elastomeric annulus 42 and the second elastomeric annulus 44 tend to move the first metal annulus 41 and the second metal annulus 43 against each other along the axial direction defined by the axis of rotation X-X.

As indicated above, an issue with this type of mounting relates to the lubrication of the first sealing element 40. Indeed, in conventional structures, the housing 4 is typically isolated from the internal volume of the crankcase 1 by a seal qualified as absolute, which commonly comprises a dynamic seal coupled to a reinforced sealing adapted in particular to withstand any peak pressures, for example a lip ring. However, such a mounting completely isolates the housing 4 from the internal volume of the crankcase 1, which therefore requires providing lubrication from the design, for example by inserting a predetermined amount of oil into the housing 4. However, this imposes regular maintenance operations in order to reintroduce oil into the housing 4, insofar as the oil gradually escapes towards the external environment. Furthermore, such structures raise an issue in the event of a peak pressure in the internal volume of the crankcase 1, which can then cause a destruction of the sealing element positioned in the housing 4.

The structure proposed in the present disclosure proposes to position not an absolute sealing between the internal volume 2 and the housing 4, but a second sealing element 6. The second sealing element 6 proposed being adapted to allow a passage of fluid from the internal volume 2 to the housing 4 when the pressure in the internal volume 2 is less than or equal to a pressure threshold value, and to isolate the housing 4 from the internal volume 2 when the pressure deviation between the internal volume 2 and the housing 4 is greater than said pressure threshold value, and thus not to allow a passage of fluid from the internal volume 2 to the housing 4 when the pressure deviation between the internal volume 2 and the housing 4 is greater than said pressure threshold value. The second sealing element 6 thus has a function of a calibrated valve, or of a two-way stream nozzle.

The passage in the second sealing element can also work in the opposite way, which allows a passage of oil from the housing to the internal volume when the pressure rises in the internal volume, particularly in the event of heating. Such operation in both stream ways is not detrimental to the lubrication of the housing 4.

The second sealing element 6 thus allows achieving a calibrated flow of oil from the internal volume 2 to the housing 4 when the pressure deviation between the internal volume 2 and the housing 4 is less than or equal to a predetermined pressure threshold value. The second sealing element 6 thus typically has a passage, allowing fluid circulation between the internal volume 2 and the housing 4 as long as the pressure is less than or equal to a pressure threshold value, and closing when the pressure deviation between the housing 4 and the internal volume 2 exceeds the pressure threshold value, then isolating the internal volume 2 from the housing 4. More generally, the second sealing element 6 is calibrated such that the fluid flow rate that can pass in the housing 4 does not lead to an excessive pressure rise in the housing 4. According to one example, the second sealing element can be calibrated so as to allow a pressure rise on the order of 0.2 bar in the housing 4, causing it to pass from a pressure of 3 bar to a pressure of 3.2 bar, in the case where 3 bar is the pressure value in the housing 4 and in the internal volume 2 before a peak pressure in the internal volume 2.

This function thus allows ensuring continuous lubrication of the housing 4, while protecting the first sealing element 40 against peak pressures within the internal volume 2. Indeed, in the event of a peak pressure within of the internal volume 2, the second sealing element 6 is not conductive, and then behaves like absolute sealing, preventing too high a pressure from reaching the housing 4, which could cause degradation of the first sealing element 40.

The pressure threshold value is for example comprised between 2.5 and 3.5 bar, or more specifically between 3 and 3.2 bar. More generally, the operation in conductive or non-conductive mode may depend on a pressure difference on either side of the second sealing element 6, for example when the pressure difference is greater than or equal to 0.5 bar, or greater than or equal to 0.2 bar, or even greater than or equal to 0.1 bar.

In the opposite direction, when the pressure in the internal volume 2 does not exceed the pressure threshold value, the second sealing element 6 allows a passage of fluid. When heating occurs in the housing 4, this pressure rise is slow, and oil flows towards the internal volume 2 before a peak pressure is created. In this manner, the pressure in the housing 4 does not exceed the pressure of the internal volume 2 as long as the latter is lower than the pressure threshold. There is no possibility of pressure rise in the housing 4 by itself. The risk of destruction of the first sealing element 40 or of ejection of oil by pressure rise in the housing 4 is also eliminated.

The second sealing element 6 can for example be positioned between two rolling elements forming a rolling bearing 30 of the hydraulic machine 1, between the rolling bearing 30 and the housing 4, or between the internal volume 2 and the rolling bearing 30.

Figure 3:
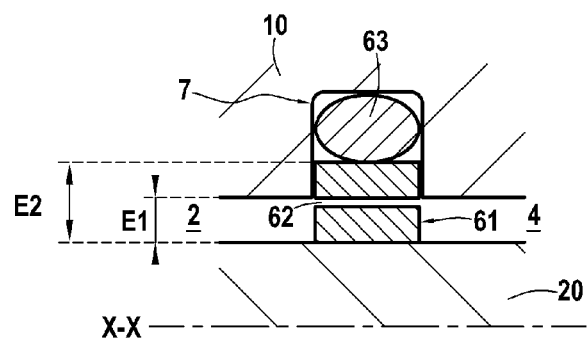
FIG. 3 is a detailed view in cross-section of a sealing element according to one aspect of the disclosure.

Exemplary embodiments of the second sealing element 6 will now be described with reference to FIGS. 3, 4 and 5. The two functions of the second sealing element 6, namely a function of sealing and a function of fluid passage are here performed by the same parts.

These figures represent the second sealing element 6, which is here composed of a ring 61 and an O-ring 63. The second sealing element 6 is positioned in a groove 7 formed at an interface between the first assembly 10 and the second assembly 20. The groove 7 can extend radially or axially relative to the axis of rotation X-X. The examples illustrated in FIGS. 3, 4 and 5 represent grooves extending radially relative to the axis of rotation X-X. It is however understood that the operation for an axial groove is similar. A structure having an axial groove will be presented below. The groove 7 is interposed between the internal volume 2 and the housing 4.

The ring 61 typically forms an annulus around the axis of rotation X-X. It can have a rectangular section (as seen in FIG. 3), or a rectangular section with a protrusion 64 adapted to come into contact with a wall of the first assembly 10 or the second assembly 20 (as seen in FIG. 5). One or several bores 62 are made in the ring 61, these bores 62 being adapted to allow a passage of fluid through the ring 61, and therefore form the passage mentioned above for the second sealing element 6.

The ring 61 has a thickness strictly greater than the spacing between the first assembly 10 and the second assembly 20 around the groove 7, along the axial direction or along the radial direction depending on the orientation of the groove 7.

In the example illustrated, the first assembly 10 and the second assembly 20 are spaced apart by a gap E1 on either side of the groove 7, radially relative to the axis of rotation X-X. The ring 61 thus has a thickness E2 along the radial direction, strictly greater than E1, so that the ring 61 cannot come out of the groove 7. The groove 7 has a radial dimension strictly greater than E2, so as to allow the ring 61 and the O-ring 63 to be housed therein.

The O-ring 63 can have a circular, oval section or any other section. In the examples represented in FIGS. 3, 4 and 5, the O-ring 63 has a circular section, and is positioned around the ring 61, that is to say it is in contact with the ring 61 and surrounds it from the outside, radially relative to the axis of rotation X-X.

Figure 4:
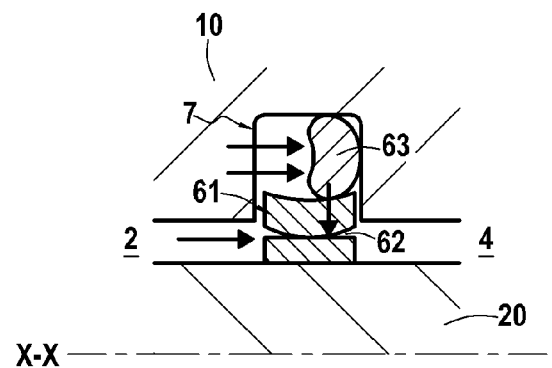
FIG. 4 is a detailed view in cross-section of a sealing element according to one aspect of the disclosure.
Figure 5:
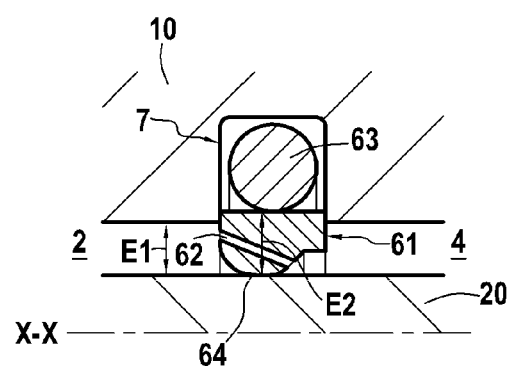
FIG. 5 is a detailed view in cross-section of a sealing element according to one aspect of the disclosure.

FIG. 4 illustrates the effect of a peak pressure in the internal volume 2.

The arrows schematize the effect of the peak pressure on the different elements of the second sealing element 6. As can be seen in this figure, the O-ring 63 is then pressed against an axial wall of the groove 7, here the wall of the groove 7 opposite to the internal volume 2. The pressure rise within the groove 7 also causes a crushing of the ring 61 under the effect of the pressure and under the effect of the O-ring 63 which compresses the ring 61.

This crushing of the ring 61 causes a deformation of the ring 61 which thus obturates the bores 62 when the pressure is greater than the pressure threshold value, which therefore prevents a passage of fluid through the second sealing element 6.

It is also understood that the operation is reversible; an identical function is performed in the event of a pressure rise in the housing 4 relative to the internal volume 2. The second sealing element 6 is then is adapted, when the pressure in the housing 4 is less than or equal to the pressure threshold value (or when the pressure difference between the housing 4 and the internal volume 2 exceeds a threshold value), to allow a passage of fluid from the housing 4 to the internal volume 2, and when the pressure in the housing 4 is greater than the pressure threshold value, to isolate the housing 4 from the internal volume 2, which allows preventing the ingress of impurities into the internal volume 2.

Figure 6:
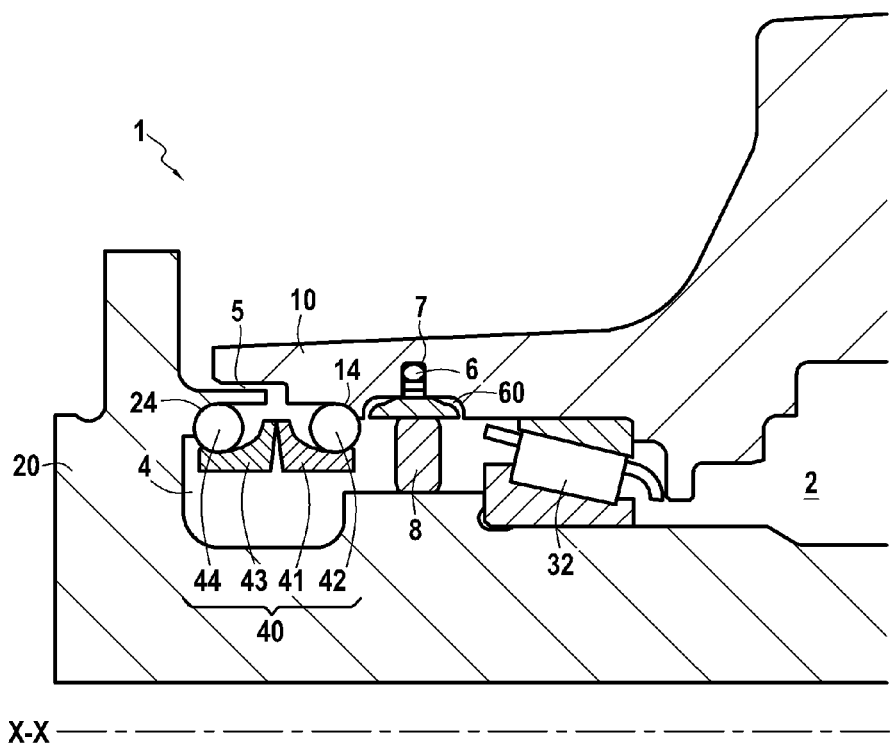
FIG. 6 shows a cross-sectional elevational view of an example of a hydraulic machine according to one aspect of the disclosure.

FIG. 6 shows one variant of the embodiment already described with reference to FIG. 2. The sealing between the first assembly 10 and the second assembly 20 is ensured by an absolute sealing and by a second sealing element 6 as previously defined.

In this exemplary embodiment, an absolute sealing 8 is formed between the housing 4 and the internal volume 2, at the interface between the first assembly 10 and the second assembly 20. This absolute sealing 8 isolates the housing 4 from the internal volume 2, and prevents any passage of fluid between these two volumes through this sealing.

The second sealing element 6 is positioned in a bypass duct 60 formed in the first assembly 10 or in the second assembly 20, and thus allows ensuring a passage of fluid in the manner of a calibrated valve or a two-way stream nozzle as already described above.

The operation is identical to the operation already described with reference to FIGS. 2 to 5.

The bypass duct 60 can for example be formed of bores opening out onto a valve forming an outer calibrated valve or an outer two-way stream nozzle, for example a metal valve with 2 tubes, which here constitutes the second sealing element 6.

Figure 7:
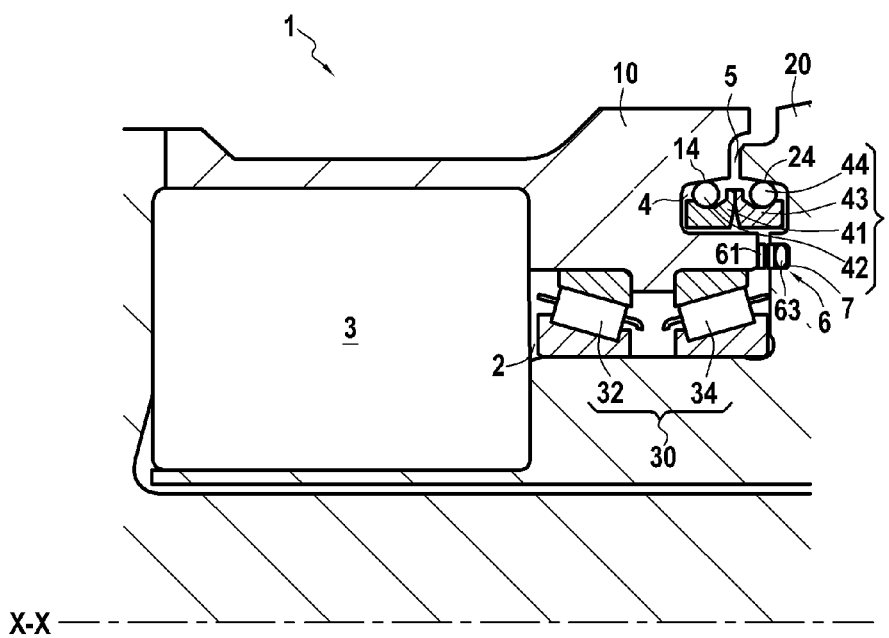
FIG. 7 shows a cross-sectional view of an example of a hydraulic machine according to one aspect of the disclosure.

FIG. 7 shows one variant of the embodiment already described with reference to FIG. 2.

In this embodiment, the groove 7 is formed along the axial direction of the axis of rotation X-X.

The second sealing element 6 thus extends along the axial direction, and not along the radial direction. Considering a second sealing element 6 comprising a ring 61 and an O-ring 63 as described above, the ring 61 and the O-ring 63 are then superposed along the axial direction.

The operation is identical to the operation already described with reference to FIGS. 2 to 5.

The structure as proposed thus allows protecting the sealing of the rotating machines by isolating an internal volume relative to the surrounding environment from pressure rises within the internal volume but also from lack of lubrication in the housing, and from pressure rises in the housing by heating. The housing can thus be reduced because it no longer has to fulfill an oil storage and reserve function insofar as the lubrication of the first sealing element 40 is ensured with oil coming from the internal volume of the hydraulic machine. The hydraulic machine is more reliable, less bulky, and no longer requires specific maintenance of the oil in the housing.

Although the present invention has been described with reference to specific exemplary embodiments, it is obvious that modifications and changes can be made to these examples without departing from the general scope of the invention as defined by the claims. Particularly, individual characteristics of the different illustrated/mentioned embodiments can be combined in additional embodiments. Accordingly, the description and the drawings should be considered in an illustrative rather than restrictive sense.

It is also obvious that all the characteristics described with reference to one method are transposable, alone or in combination, to one device, and conversely, all the characteristics described with reference to one device are transposable, alone or in combination, to one method.

The invention claimed is:

1. A hydraulic machine comprising a first assembly and a second assembly moveable in rotation relative to each other along an axis of rotation defining a fixed assembly and a moveable assembly, said hydraulic machine comprising a crankcase defining an internal volume comprising a cylinder block, the volume outside the crankcase being referred to as the external environment, wherein an interface between the fixed assembly and the moveable assembly comprises a housing provided with a first dynamic sealing element ensuring the sealing of the internal volume relative to the external environment, wherein the first sealing element is an axial seal comprising a first metal annulus, a second metal annulus, a first elastomeric annulus and a second elastomeric annulus, the first metal annulus and the second metal annulus being mounted leaning against each other along an axial direction defined by the axis of rotation, the first elastomeric annulus being interposed between the first metal annulus and a wall of the first assembly, and the second elastomeric annulus being interposed between the second metal annulus and a wall of the second assembly.

2. The hydraulic machine according to claim 1, wherein the second sealing element comprises a passage adapted to be closed when the pressure deviation between the internal volume and the housing exceeds the threshold value.

3. The hydraulic machine according to claim 1, wherein the first sealing element is an axial seal comprising a first metal annulus, a second metal annulus, a first elastomeric annulus and a second elastomeric annulus, the first metal annulus and the second metal annulus being mounted leaning against each other along an axial direction defined by the axis of rotation, the first elastomeric annulus being interposed between the first metal annulus and a wall of the first assembly, and the second elastomeric annulus being interposed between the second metal annulus and a wall of the second assembly.

4. The hydraulic machine according to claim 1, wherein the second sealing element comprises an O-ring.

5. The hydraulic machine according to claim 4, wherein the second sealing element comprises a ring on which the O-ring is mounted.

6. The hydraulic machine according to claim 5, wherein the ring comprises a bore, adapted to allow a passage of oil when the pressure deviation between the internal volume and the housing is less than or equal to the pressure threshold value, and not to allow a passage of oil when the pressure deviation between the internal volume and the housing exceeds the threshold value.

7. The hydraulic machine according to claim 1, wherein the second sealing element is positioned between two rolling elements ensuring the relative rotational movement between the first assembly and the second assembly.

8. The hydraulic machine according to claim 1, wherein the second sealing element is made in one piece.

9. The hydraulic machine according to claim 1, wherein the second sealing element is adapted, when the pressure deviation between the internal volume and the housing is less than or equal to the pressure threshold value, to allow a passage of oil from the housing to the internal volume, and when the pressure deviation between the internal volume and the housing is greater than the pressure threshold value, to isolate the housing from the internal volume.

10. The hydraulic machine according to claim 1, wherein the second sealing element is interposed between two surfaces facing each other along the axial direction defined by the axis of rotation.

11. The hydraulic machine according to claim 1, wherein the second sealing element is interposed between two surfaces facing each other along the radial direction relative to the axis of rotation.

12. The hydraulic machine according to claim 1, wherein the pressure threshold value is equal to 0.5 bar, or more specifically 0.2 bar.

13. The hydraulic machine according to claim 1, comprising a cylinder block provided with a plurality of housings extending radially relative to the axis of rotation in which cylinders are disposed, and a multi-lobe cam surrounding the cylinder block.

* * * * *